(12) United States Patent
Ellstrom

(10) Patent No.: US 6,667,108 B2
(45) Date of Patent: Dec. 23, 2003

(54) WEARPROTECTED WOOD VENEER

(76) Inventor: Erick Ellstrom, 361 NW. 113th Pl., Seattle, WA (US) 98177

( * ) Notice: Subject to any disclaimer, the term of this patent is extended or adjusted under 35 U.S.C. 154(b) by 0 days.

(21) Appl. No.: 10/072,275

(22) Filed: Feb. 7, 2002

(65) Prior Publication Data

US 2003/0148135 A1 Aug. 7, 2003

(51) Int. Cl.⁷ ............................................ B32B 21/04
(52) U.S. Cl. .................. 428/537.1; 428/537.5; 428/99; 428/100; 428/66.2; 428/213; 428/220; 428/424.6; 156/228; 156/306.6; 156/306.9; 156/307.1; 156/307.3; 156/307.4; 156/307.5; 156/307.7; 156/331.1; 156/331.5; 156/331.8
(58) Field of Search ............... 428/99, 100, 66.2, 428/213, 220, 537.5, 537.1, 624.6; 156/228, 306.6, 306.9, 307.1, 307.3, 307.4, 307.5, 307.7, 331.1, 331.5, 331.8

(56) References Cited

U.S. PATENT DOCUMENTS

| | | | | |
|---|---|---|---|---|
| 4,045,262 A | * | 8/1977 | Enzinger et al. | 156/62.2 |
| 5,439,749 A | * | 8/1995 | Klasell et al. | 428/537.1 |
| 5,925,211 A | * | 7/1999 | Rakauskas | 156/306.9 |
| 6,103,333 A | * | 8/2000 | Keith | 428/99 |
| 6,125,906 A | * | 10/2000 | Kotin | 160/236 |
| 6,497,938 B1 | * | 12/2002 | Hill | 428/131 |
| 6,517,935 B1 | * | 2/2003 | Kornfalt et al. | 428/331 |

* cited by examiner

Primary Examiner—Leszek Kiliman
(74) Attorney, Agent, or Firm—Christensen O'Connor Johnson Kindness PLLC

(57) ABSTRACT

A resin impregnated overlay is applied to a wood veneer, which in turn may be adhered to a substrate.

21 Claims, 1 Drawing Sheet

WEARPROTECTED WOOD VENEER

FIELD OF THE INVENTION

The present invention relates to wood veneers and more particularly to transparent wear-resistant overlays applied to wood veneers for use in a variety of applications including flooring, furniture, doors, wall panels and the like.

BACKGROUND OF THE INVENTION

Laminated wood panels with faux veneer are manufactured for use in a variety of applications, including flooring, cabinetry, doors and trim. The faux veneer is typically made by producing a photographic reproduction of wood on paper. The paper is then applied to a substrate. A protective layer is then overlaid on the photographic layer. If desired, the overlay can be made wear-resistant by incorporating abrasion resistant materials in the overlay.

While the faux veneer laminates have been widely successful, some applications require a real wood surface and look. Thus attempts have been made to use the faux veneer technology to produce panels in which a wood veneer is substituted for the photographic paper. These attempts, however, have not met with success for a variety of reasons. The principal reason is that the wood veneer has a moisture content that is higher than that of the photographic paper. As a consequence, moisture in the form of steam is generated during the manufacture of the laminate. The steam creates bubbles and discontinuities in the final product, yielding an unsatisfactory appearance for high quality applications.

SUMMARY OF THE INVENTION

A wear-resistant veneer product includes a substrate that has real wood veneer adhesively secured to the substrate. A resin impregnated protective layer is adhered to the veneer under conditions of pressure, temperature, and time that inhibit the generation of sufficient moisture from the veneer and resins to degrade the visual quality of the product.

The product is made by adhesively securing a veneer to a substrate under pressure and optionally at an elevated temperature. The veneer is then conditioned, e.g., sanded, in preparation for receiving an overlay. An overlay, preferably comprising a resin impregnated paper, is then adhesively secured to the veneer under process conditions that inhibit the generation of steam and/or water vapor that would otherwise visually degrade the surface of the veneer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
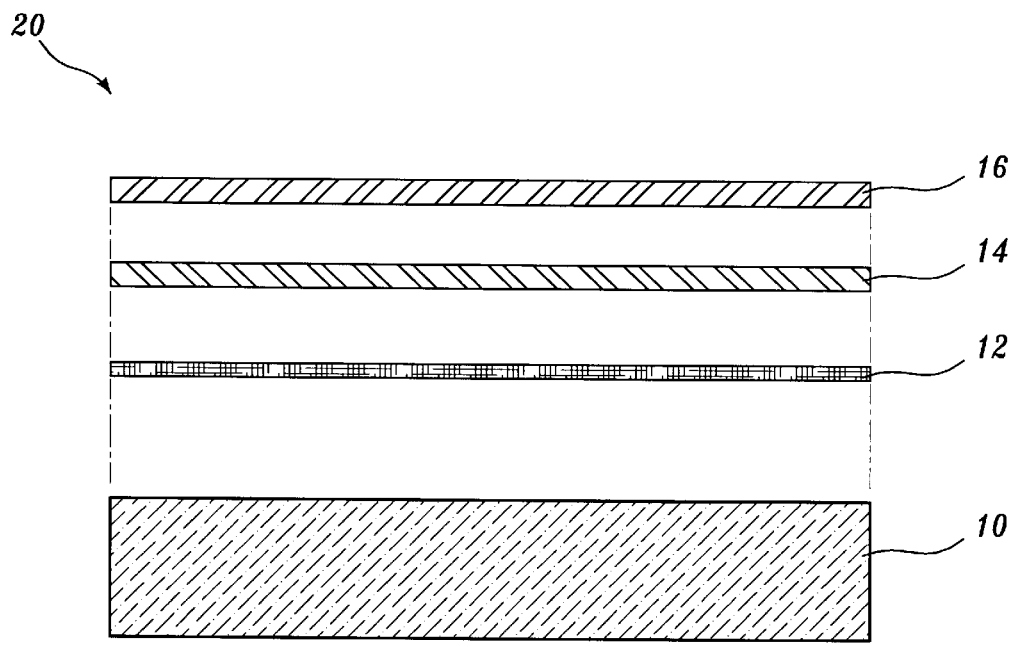
FIG. 1 is an exploded sectional view of the product of the present invention prior to manufacture.

Referring to the drawings, a substrate 10 having a smooth upper surface first has a layer of resin 12 applied to its upper surface. A layer of wood veneer 14 is then applied to the adhesive layer 12 and the combination is placed between the platens of a conventional laminating press. This step usually takes place under pressure and optionally with the application of heat to the platen. If desired, a second layer of adhesive can be applied to the lower surface of the substrate 10 at the same time the layer 12 is applied and when the veneer 14 is laminated onto the substrate, a bottom protective layer of paper or other material is simultaneously applied to the bottom of the substrate.

Figure 2:
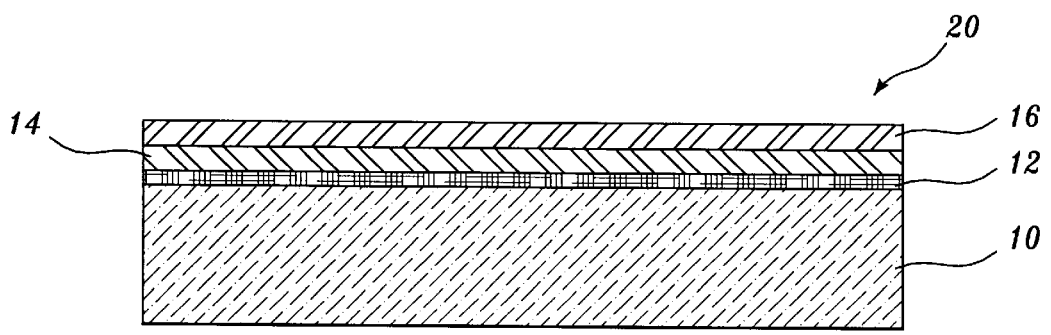
FIG. 2 is a cross-sectional view of the final product made in accordance with the present invention.

Thereafter, a layer 16 of resin impregnated paper is laid on the veneer 14 and the combination again is placed between the platens of a conventional laminating press. In this step, however, predetermined pressure and temperature is applied to the platens so as to accelerate curing of the resins impregnated in the layer 16. In this step care is taken to carefully control the temperature and pressure, and the time for which the pressure is applied in the platens. When the overlay is properly applied, the final product 20 (shown in FIG. 2) has the desired characteristics of a wood grain appearance provided by the veneer 14 protected by a transparent layer 16 without the visual degradation caused by generation of moisture from the resins and the wood veneer 14.

The substrates that can be employed with the invention are preferably medium density fiberboards. Fiberboard having a basis weight on the order of 48 pounds per cubic feet (industrial grade) can be used. These fiberboard panels typically have a thickness ranging from ⅛ inch to ¾ inch and preferably are about ½ inch thick. Alternatively, dried lumber panels, plywood panels, and other suitable building materials can be employed as a substrate.

The wood veneer employed in the present invention is the same as conventionally used in a variety of cabinet making and building applications. It is generally available from a variety of manufacturers. Of course, it can come in a variety of thicknesses and representing a variety of species of tree. Preferably, the veneer is on the order of 1/28 inch thick, however, other thicknesses can be employed as desired and available.

The adhesive employed in accordance with the present invention to secure the veneer to the substrate is similar to that used in prior art applications of photographic papers to substrates. The adhesives include conventional ureas, urethanes, urea-urethane blends, polyvinyl alcohol, and epoxy resins. Normally, the adhesive is applied in a thin layer on the order of 2 to 4 mils thick. Because both heat and pressure are utilized in applying the overlay to the veneer, it is preferred that the adhesive used to apply the veneer is heat resistant so that it is not degraded and so that it does not produce steam or other gases when the overlay is applied. Careful selection of the adhesive in accordance with the present invention will achieve this end. A specific example of a suitable adhesive is a urea-formaldehyde resin available under the product code CR583 and catalyst code FM292B from Borden Chemical, Inc., Louisville, Ky.

The overlay applied to the top of the veneer is typically paper, and preferably an alpha nitrocellulose paper. Synthetic polymeric films may be used in place of the paper. For flooring applications, a paper that is impregnated with an adhesive resin that once cured becomes transparent is most preferred. For commercial applications, melamine resins are most preferred. Other resins such as urethanes, urea-urethane blends, polyvinyl alcohols and epoxy resins can also be used. The paper is impregnated using conventional paper impregnation techniques. The final concentration of resin in the paper can vary widely from 50 to 80 percent by weight resin based on the total weight of the paper and resin, more preferably 60 to 75 percent by weight and most preferably 70 to 72 percent by weight. The weight of the paper can vary widely. It is preferred, however, that the paper have a basis weight on the order of 14 to 40 grams. If desired, a wear-resistant medium such as aluminum oxide, silica or other abrasion resistant materials can be incorporated into the resin during the impregnation process.

The overlay is applied to the veneer between the platens of a conventional laminating press. The upper platen contacting the overlay, and the lower platen if desired, are heated to a predetermined temperature and pressure is applied for a time adequate to cure the resin to secure the overlay on the veneer and to render the resin and paper transparent. The heat applied, the pressure and the time are carefully adjusted so that the generation of moisture from the resins and the wood veneer itself are inhibited or eliminated. In this manner, no steam or other gasses are generated that would otherwise be trapped under the overlay and visually degrade the final appearance of the veneer product. Typical press temperatures utilized in accordance with the present invention range from 170° C. to 200° C., preferably from 175° C. to 195° C., more preferably from 180° C. to 190° C., and most preferably on the order of 185° C. to 187° C. Typical pressures used in accordance with the present invention that range from 230 to 270 bar, and more preferably from 240 to 260 bar. The time during which the temperature and pressure is applied can range from 20 to 40 seconds, more preferably from 25 to 35 seconds and most preferably from 26 to 28 seconds. For a smooth surface final product, it is preferred that the substrate surface be sanded to ±0.006 inches, and that the veneer surface after application to the substrate be sanded to ±0.006 inches.

The foregoing times, temperatures, and pressures can be varied depending on the particular resin, the resin loading levels in the paper, the thickness of the overlay and the veneer, as well as other press conditions known to one of ordinary skill. Perhaps the most important factor is to choose the appropriate adhesive with which to impregnate the paper overlay. The resins must be formulated with a combination of water, release agents, plasticizers, anti-blocking agents, catalyzers and if desired, surfactants. A typical thermosetting is a moisture resistant thermosetting melamine resin containing melamine resin (M345 available from Borden Company), up to about 1% release agent, about 3% to 5% plasticizer (e.g., diethylene glycol), up to about 1½% surfactant (anionic, cationic or nonionic), up to about ½% anti-blocking agent, such as a wax dispersion, about 4% to 8% water and up to 1½% catalyst.

Laminating presses that can be utilized in accordance with the present invention are typically referred to as "melamine" presses. Such presses are commercially available from the Heinrich Wemhoener GmbH and CoKG, Herford, Germany, and other known sources.

While the preferred embodiment of the invention has been illustrated and described, it will be appreciated that various changes can be made therein without departing from the spirit and scope of the invention. For example, it may be desirable to sell the veneer with the overlay alone without an underlying substrate. In this case, the foregoing process would be followed without the adhesive layer 12 and underlying support substrate 10.

The embodiments of the invention in which an exclusive property or privilege is claimed are defined as follows:

1. A wearprotected wood veneer comprising:

a substrate, a wood veneer adhesively secured to said substrate, a resin impregnated, transparent, protective paper layer overlying and adhered to said veneer under conditions of temperature, pressure, and time that inhibit the generation of sufficient moisture from the veneer and resins to degrade the visual quality of the product.

2. The product of claim 1 wherein said substrate is fiberboard.

3. The product of claim 1 wherein said protective layer is paper.

4. The product of claim 3 wherein said paper is impregnated with wear-resistant materials.

5. The product of claim 4 wherein said wear-resistant materials are selected from aluminum oxide and silica.

6. The method of manufacturing a wearprotected wood veneer comprising the steps of adhesively securing a wood veneer to a substrate, overlaying and adhesively securing a transparent protective paper layer on said veneer without generating water vapor or other gases from the veneer and resins that visually degrade the surface of the product.

7. The method of claim 6 wherein said protective layer comprises paper.

8. The method of claim 7 wherein said paper is resin impregnated.

9. The method of claim 7 wherein said paper is impregnated with wear-resistant materials.

10. The method of claim 9 wherein said wear-resistant materials are selected from the group consisting of aluminum oxide and silica.

11. The method of claim 7 wherein said protective layer is applied under pressure and at an elevated temperature.

12. The method of claim 11 wherein the temperature of application ranges from 170° C. to 200° C.

13. The method of claim 12 wherein the temperature of application ranges from 175° C. to 195° C.

14. The method of claim 11 wherein the temperature of application ranges from 180° C. to 198° C.

15. The method of claim 11 wherein said temperature ranges from 184° C. to 188° C.

16. The method of claim 11 wherein the pressure ranges from 230 bar to 270 bar.

17. The method of claim 16 wherein the pressure ranges from 240 bar to 260 bar.

18. The method of claim 11 wherein the time of application under temperature and pressure is sufficient to inhibit generation of steam that will degrade the visual appearance of the product.

19. The method of claim 18 wherein the time ranges from 20 to 40 seconds.

20. The method of claim 19 wherein the time ranges from 25 to 35 seconds.

21. The method of claim 20 wherein the time ranges from 26 to 28 seconds.

* * * * *